(12) United States Patent
Enderle et al.

(10) Patent No.: US 8,727,933 B2
(45) Date of Patent: May 20, 2014

(54) BOLT ON CARRIER FOR INTEGRATED FINAL DRIVE WITH CLOSED CIRCUIT HYDROSTATIC MOTOR

(75) Inventors: Nathan Enderle, East Peoria, IL (US); Sean McGrane, Germantown Hills, IL (US); Christopher Demick, Fuquay-Varina, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/572,826

(22) Filed: Aug. 13, 2012

(65) Prior Publication Data

US 2014/0045635 A1    Feb. 13, 2014

(51) Int. Cl.
*F16H 57/08* (2006.01)

(52) U.S. Cl.
USPC ............................................ 475/331

(58) Field of Classification Search
USPC ................................ 475/331, 348
See application file for complete search history.

(56) References Cited

U.S. PATENT DOCUMENTS

| | | |
|---|---|---|
| 3,934,665 A | 1/1976 | Egorov et al. |
| 3,951,481 A | 4/1976 | Ritter, Jr. |
| 4,988,329 A | 1/1991 | Lammers |
| 5,380,254 A | 1/1995 | Maguire et al. |
| 5,401,218 A | 3/1995 | Rassieur et al. |
| 5,472,059 A | 12/1995 | Schlosser et al. |
| 6,604,591 B2 | 8/2003 | Bowen et al. |
| 7,204,782 B2 * | 4/2007 | Ciszak et al. ............... 475/331 |
| 7,455,616 B2 * | 11/2008 | Beltowski ............... 475/331 |
| 8,038,570 B2 * | 10/2011 | Loeber ............... 475/348 |
| 8,062,160 B2 * | 11/2011 | Shibukawa ............... 475/150 |
| 8,500,591 B2 * | 8/2013 | Turner et al. ............... 475/159 |

* cited by examiner

*Primary Examiner* — Dirk Wright
(74) *Attorney, Agent, or Firm* — Miller, Matthias & Hull

(57) ABSTRACT

A final drive assembly for a machine is disclosed. The final drive assembly may comprise a motor coupled with a motor housing, a driven component rotatably mounted on the motor housing by at least one bearing, and a planetary transmission configured to transfer power from the motor to the driven component. The planetary transmission may have a stationary carrier coupled with the motor housing, and the carrier may be adapted to retain the at least one bearing.

20 Claims, 5 Drawing Sheets

BOLT ON CARRIER FOR INTEGRATED FINAL DRIVE WITH CLOSED CIRCUIT HYDROSTATIC MOTOR

FIELD OF THE DISCLOSURE

The present disclosure relates generally to a final drive assembly, and, more particularly, to an integrated final drive assembly utilizing a closed circuit hydrostatic motor.

BACKGROUND OF THE DISCLOSURE

Many final drive assemblies of machines used in earth-moving, industrial and agricultural applications utilize hydraulic motors and double reduction gear sets of the planetary type to drive track assemblies or wheels. Such machines include, but are not limited to, track-type tractors, wheel loaders, excavators, articulated trucks and the like. With such final drive assemblies, the particular configuration of assembly components and the spatial relationship among the individual components can result in a sizeable, rigid structure having many parts.

For example, conventional drive assemblies include reaction hubs applied to bearings that support the output sprockets. These reaction hubs provide the proper pre-load to the bearings, but may also require extra space within the drive assembly. In addition, the use of a reaction hub increases the cost of the assembly.

Furthermore, in conventional drive assemblies, the carrier function and the motor housing are provided by a single piece, both functions being inseparable. This results in only one combination of motor housing and planetary gear size because a different gear set would require a different motor housing, as well as a different spatial relationship or positioning within the assembly. Therefore, due to the particular configuration of conventional drive assemblies, there is no flexibility in the planetary gear ratio after manufacture.

Thus, there exists a need for an improved, compact, and cost-effective final drive assembly in such machines.

SUMMARY OF THE DISCLOSURE

An exemplary embodiment of the present disclosure is directed to a final drive assembly for a machine. The final drive assembly may comprise a motor coupled with a motor housing, a driven component rotatably mounted on the motor housing by at least one bearing, and a planetary transmission configured to transfer power from the motor to the driven component. The planetary transmission may have a stationary carrier coupled with the motor housing, and the carrier may be adapted to retain the at least one bearing.

According to another exemplary embodiment of the present disclosure, a final drive assembly for driving a sprocket hub of a machine is disclosed. The final drive assembly may comprise a motor coupled with a motor housing, the sprocket hub rotatably mounted on the motor housing by at least one sprocket bearing. The final drive assembly may further comprise a first planetary gear set operatively configured to transfer power from the motor to a second planetary gear set. The second planetary gear set may include a sun gear adapted to receive power from the first planetary gear set, a plurality of planet gears in meshing contact with the sun gear and a ring gear, the ring gear coupled to the sprocket hub, and a stationary carrier locating the plurality of planet gears. The stationary carrier may be coupled with the motor housing and adapted to retain the at least one sprocket bearing.

According to yet another exemplary embodiment of the present disclosure, a method for constructing a final drive assembly is disclosed. The method may comprise providing the final drive assembly with a motor, a motor housing coupled with the motor, a sprocket hub rotatably mounted on the motor housing by at least one sprocket bearing, and a planetary transmission having a stationary carrier. The method may further comprise abutting the stationary carrier against the at least one sprocket bearing and the motor housing, and bolting the stationary carrier to the motor housing to retain the at least one sprocket bearing.

These and other aspects and features of the invention will become more readily apparent upon reading the following detailed description when taken in conjunction with the accompanying drawings.

Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof will be shown and described below in detail. The invention is not limited to the specific embodiments disclosed, but instead includes all modifications, alternative constructions, and equivalents thereof.

DETAILED DESCRIPTION

Figure 1:
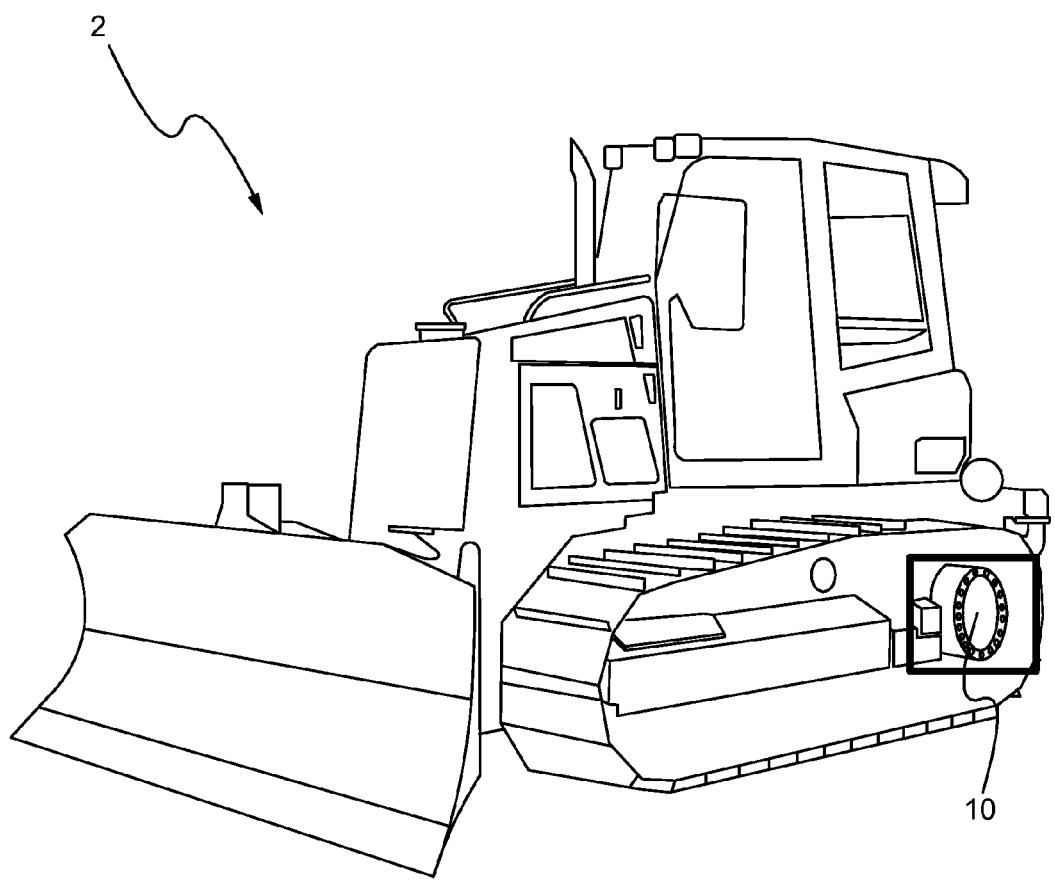
FIG. 1 is a perspective view of a machine according to an exemplary embodiment of the present disclosure.
Figure 2:
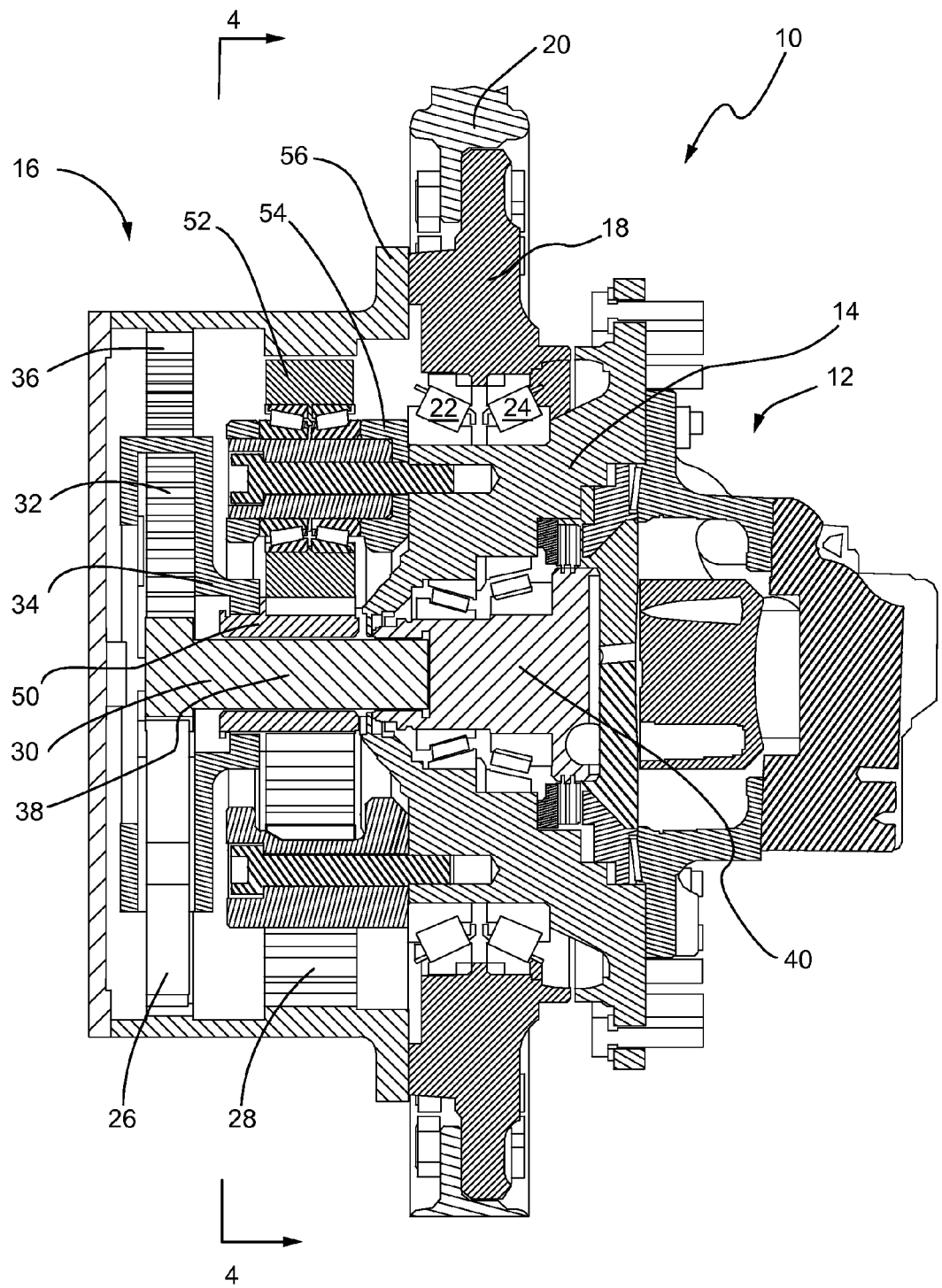
FIG. 2 is a cross-sectional view of a final drive assembly according to another exemplary embodiment of the present disclosure.

Reference will now be made in detail to specific embodiments or features, examples of which are illustrated in the accompanying drawings. Turning now to FIGS. 1 and 2, a final drive assembly 10 of a machine 2 is shown, according to an exemplary embodiment of the present disclosure. Although the machine 2 is shown to be a track-type tractor, it will be understood that in other embodiments, the machine may be any other type of machine or vehicle, used in earth-moving, industrial and agricultural applications, that utilizes a final drive assembly. For example, the machine 2 may be, but not be limited to, a tract-type tractor, a wheel loader, a motor grader, an excavator, an articulated truck, a pipelayer, a backhoe, or the like. It is also to be understood that the machine 2 and the final drive assembly 10 is shown mainly for illustrative purposes to assist in disclosing features of various embodiments of the invention, and that FIGS. 1 and 2 may not depict all of the components of an exemplary machine or of an exemplary final drive assembly.

As shown in FIG. 2, the final drive assembly 10 may comprise a motor 12 coupled with a spindle or motor housing 14. For example, the motor 12 may comprise, but not be limited to, a closed circuit hydrostatic motor. The final drive assembly 10 may also comprise a planetary transmission 16 and a sprocket hub 18, with the motor 12 configured to drive the sprocket hub 18 and the planetary transmission 16 configured to transfer power from the motor 12 to the sprocket hub 18. The sprocket hub 18 may be coupled to a sprocket 20, which may support, including but not limited to, a wheel or track assembly (not shown). The sprocket hub 18 may be rotatably mounted on the motor housing 14 by a pair of sprocket bearings 22, 24.

The planetary transmission 16 may be comprised of, including but not limited to, a double reduction gear set, which may include a first reduction planetary gear set 26 and a second reduction planetary gear set 28. First planetary gear set 26 may comprise a first sun gear 30, a first plurality of planet gears 32, a first planet carrier 34, and a first ring gear 36. While rotatably mounted on first planet carrier 34, the first plurality of planet gears 32 may be in mesh with first sun gear 30 and first ring gear 36. The first sun gear 30 may be integrally formed with or coupled to a sun shaft 38, which is operatively connected to an output of motor 12. For example, the motor 12 may have an output shaft 40 splined to the sun shaft 38.

Second planetary gear set 28 may comprise a second sun gear 50, a second plurality of planet gears 52, a stationary second planet carrier 54, and a second ring gear 56 coupled to the sprocket hub 18, for example, by way of bolts. The second plurality of planet gears 52 may be rotatably mounted on the second planet carrier 54 and may be in mesh with second sun gear 50 and second ring gear 56. The second planet carrier 54 may be coupled to the motor housing 14, and the second ring gear 56 may be coupled to the sprocket hub 18. Furthermore, the first planet carrier 34 of first planetary gear set 26 may be splined to the second sun gear 50 of second planetary gear set 28.

Figure 3:
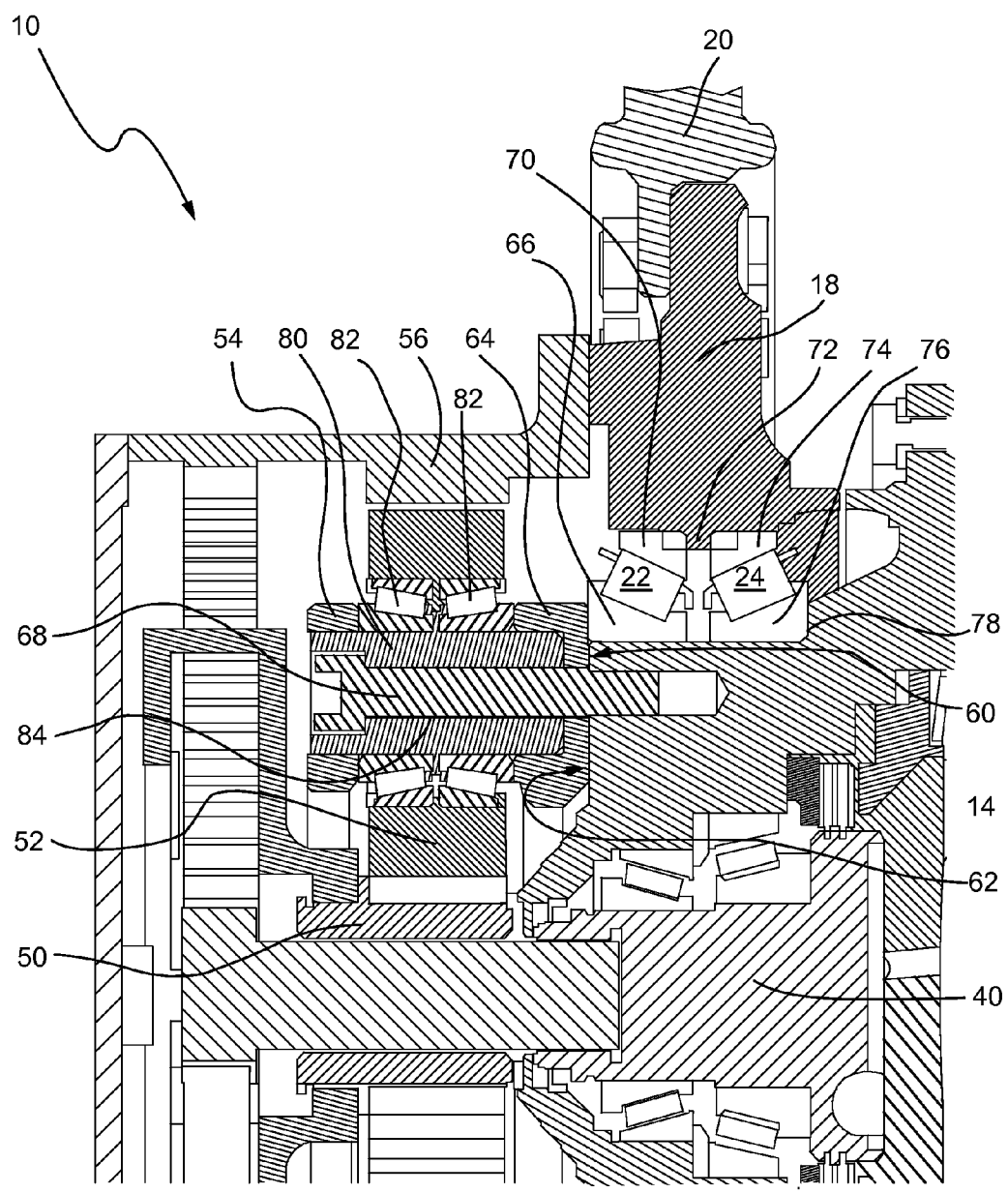
FIG. 3 is an enlarged cross-sectional view of a portion of the final drive assembly of FIG. 1.

Referring now to FIG. 3, the stationary second planet carrier 54 may be coupled with the motor housing 14 and may be adapted to retain the sprocket bearings 22, 24 that are supporting sprocket hub 18. For example, second carrier 54 may be adjacent and coupled to both the motor housing 14 and sprocket bearing 22. More specifically, a surface 60 of the second carrier 54 may abut a surface 62 of the motor housing 14, while the surface 60 of a shoulder 64 of the second carrier 54 may abut an inner race 66 of the sprocket bearing 22 (which is mounted on the motor housing 14).

A plurality of bolts 68 may couple the second carrier 54 to the motor housing 14 and may force the second carrier 54 against the sprocket bearing 22 to provide a desired pre-load force for retention of both sprocket bearings 22, 24. More specifically, bolts 68 may force the shoulder 64 of the second carrier 54 against the inner race 66 of sprocket bearing 22, while an outer race 70 of sprocket bearing 22 may abut a protrusion 72 of the sprocket hub 18. The protrusion 72 of sprocket hub 18 may abut an outer race 74 of the other sprocket bearing 24, which has an inner race 76 located in a corner 78 of the motor housing 14. This results in the pre-load force being transmitted through the sprocket bearing 22 to the sprocket hub 18, which by way of protrusion 72, transmits the pre-load force to the other sprocket bearing 24 against the motor housing 14. In this way, sprocket bearings 22, 24 may be retained within the final drive assembly 10 by bolting on second carrier 54 to the motor housing 14 without the use of a reaction hub or extra retention element.

Furthermore, the plurality of bolts 68 may be removable, and the second carrier 54, as well as other components of the planetary transmission 16, may be interchangeable, or removed and replaced with, a different carrier that may have a different gear size or gear ratio. Such structure provides for a modularity that has not been provided by the prior art. Prior designs supplied the carrier function with a single piece unitary with the motor housing. While somewhat effective for a given application, it provided only one combination of motor housing and planetary gear ratio/size transmission. With the modular approach of the present disclosure, on the other hand, different sizes of transmissions can be mounted to a given motor size easily, inexpensively, and reliably.

In addition, the second planet carrier 54 may include a plurality of pins 80. Each pin 80 may be configured to locate one of the second planet gears 52 in meshing contact with the second sun gear 50 and second ring gear 56. More specifically, planet gear 52 may be rotatably mounted on the pin 80 of the second carrier 54 by planet bearings 82.

Figure 4:
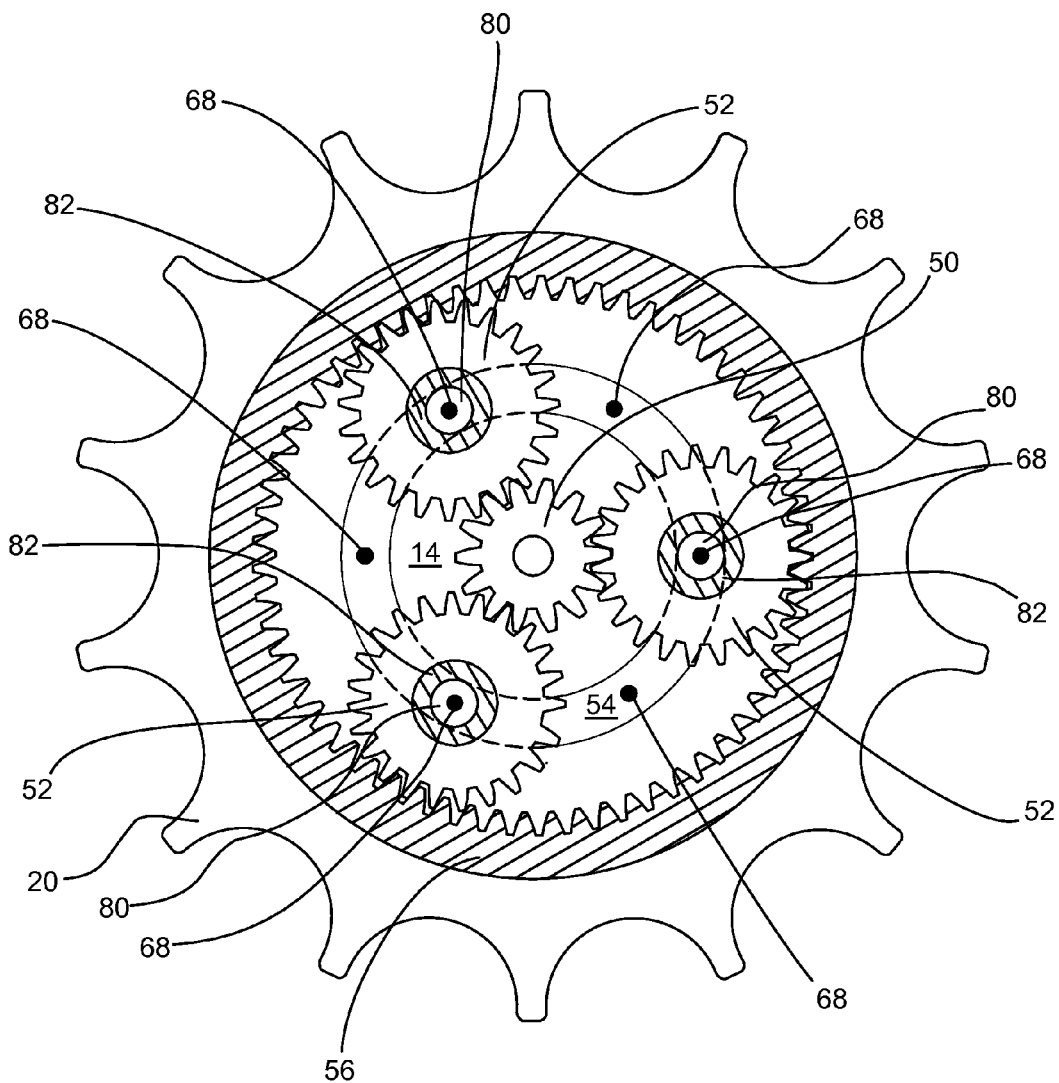
FIG. 4 is a view taken along line 4-4 of FIG. 2, illustrating a second reduction planetary gear set of the final drive assembly.

Each pin 80 may also be configured to receive one of the bolts 68 and may be adapted to assist in the retention of the second carrier 54 to the motor housing 14. For example, each pin 80 may include a bore 84 adapted to receive the bolt 68. Received in the bore 84 of the pin 80, the bolt 68 may force the pin 80 against the second carrier 54 and motor housing 14, thereby pinning the second carrier 54 between the pin 80 and motor housing 14 and retaining the second carrier 54 to the motor housing 14. As shown best in FIG. 4, some of the bolts 68 may immediately couple the second carrier 54 to the motor housing 14, and other bolts 68 may pass through the pins 80 of the second carrier 54.

INDUSTRIAL APPLICABILITY

In general, the foregoing disclosure finds utility in various industrial applications, such as in earth-moving, industrial, construction and agricultural machines. In particular, the disclosed final drive assembly may be applied to a machine 2, such as a wheel loader, a track-type tractor, a motor grader, an excavator, an articulated truck, a pipelayer, a backhoe, and the like. The final drive assembly 10 is utilized to transfer power from the motor 12 and planetary transmission 16 to the wheel or track assembly. More specifically, during operation, the rotation of output shaft 40 via actuation of closed circuit hydrostatic motor 12 causes concurrent rotation of sun shaft 38 and first sun gear 30. As the first sun gear 30 rotates, so do first planet gears 32, which transfer the power to the first planet carrier 34 at a reduced speed. Rotation of the first planet carrier 34 causes rotation of the second sun gear 50, thereby transferring the power from the first planetary gear set 26 to the second planetary gear set 28, where the speed is further reduced. As the second sun gear 50 rotates, the second planet gears 52 rotate. With the second planet carrier 54 fixed or stationary, the rotation of second planet gears 52 cause the second ring gear 56, and sprocket hub 18 coupled to the second ring gear 56, to rotate at a reduced speed. The power from the sprocket hub 18 is translated to the sprocket 20, which then drives a wheel or track assembly, causing the machine 2 to move. The desired pre-load force for retention of the sprocket bearings 22, 24 is provided by bolting the second carrier 54 to the motor housing 14, thereby eliminating the need for a reaction hub or extra retention element.

Figure 5:
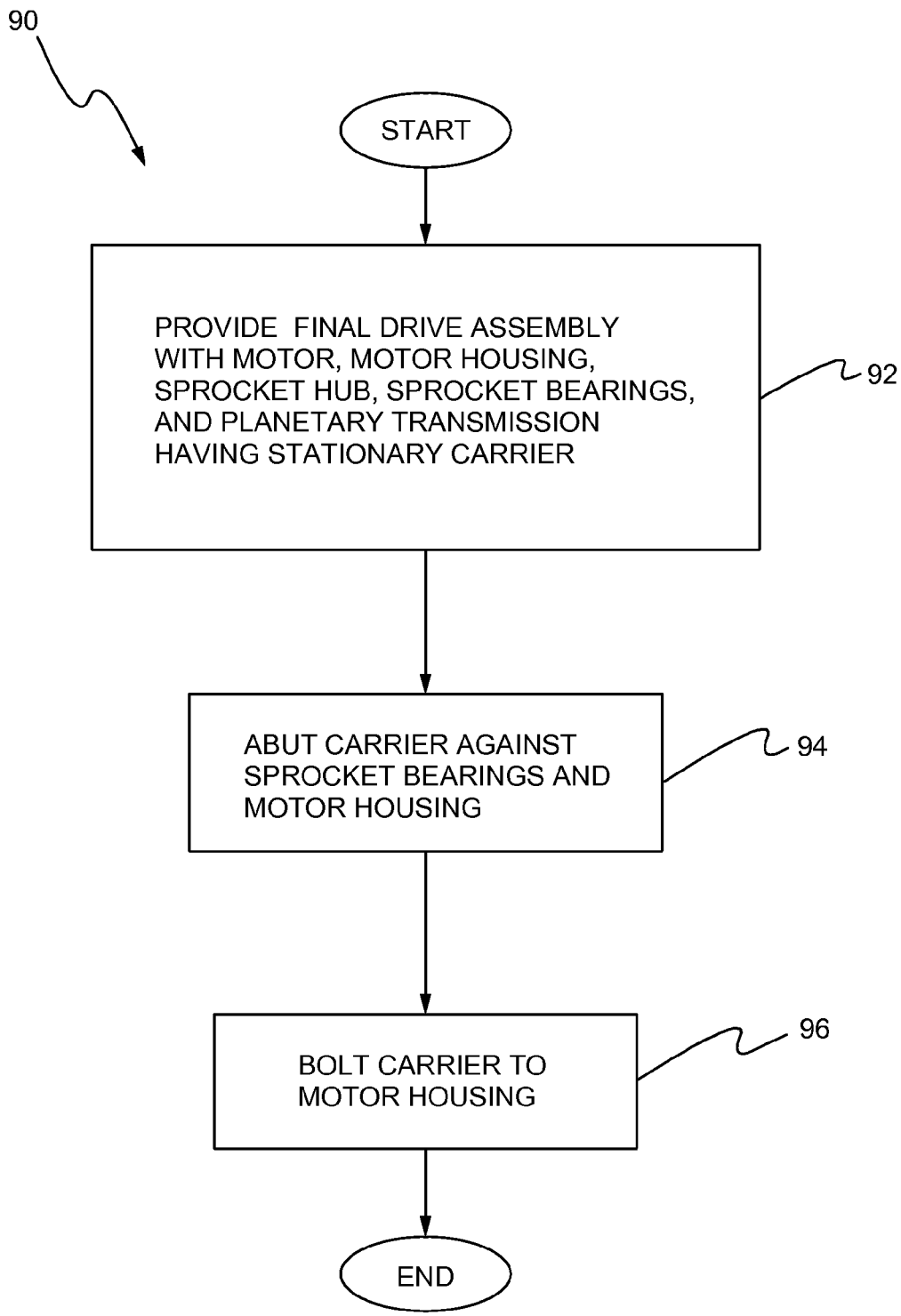
FIG. 5 is a flowchart outlining a method for constructing a final drive assembly according to another exemplary embodiment of the present disclosure.

According to another exemplary embodiment of the present disclosure, a flowchart outlining a method 90 for constructing a final drive assembly 10 is shown in FIG. 5. At a first step 92, the final drive assembly 10 is provided with the motor 12, the motor housing 14 coupled with the motor 12, the sprocket hub 18 rotatably mounted on the motor housing 14 by sprocket bearings 22, 24, and the planetary transmission 16 having the stationary carrier 54. The second step 94 of the method 90 comprises abutting the stationary carrier 54 adjacent to and against the sprocket bearings 22, 24 and the motor housing 14. At a final step 96, the stationary carrier 54 is bolted to the motor housing 14 to retain the sprocket bearings 22, 24, or provide a desired pre-load force for retention of the sprocket bearings 22, 24.

By applying this assembly and method to a machine, planetary center distance flexibility is achieved. Due to the disclosed configuration of the final drive assembly, the transmission can be interchanged to provide different drive requirements. With the planetary transmission contained and coupled to one side of the motor housing, the entire transmission can be replaced with a different transmission having a different transmission ratio. More specifically, since the disclosed bolt on carrier can be interchanged with a different carrier, many different gear sizes and gear ratios can be employed with the same motor, giving the system a modularity heretofore unknown. Therefore, such machines can have further flexibility with the planetary transmission of the disclosed drive assembly.

Furthermore, the assembly and method disclosed herein provide an integrated, compact drive assembly with an improved and efficient spatial configuration. By employing the bolt on carrier to retain the sprocket bearings, the need for a separate reaction hub for sprocket bearing retention is eliminated. Due to the elimination of a distinct sprocket bearing retention element, less space is required for the drive assembly, leading to a more compact design. In addition, the part count of the conventional drive assembly is reduced, thereby lowering the costs associated with manufacture.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

While some features are described in conjunction with certain specific embodiments of the invention, these features are not limited to use with only the embodiment with which they are described, but instead may be used together with or separate from, other features disclosed in conjunction with alternate embodiments of the invention.

What is claimed is:

1. A final drive assembly for a machine, comprising:
   a motor coupled with a motor housing;
   a driven component rotatably mounted on the motor housing by at least one bearing; and
   a planetary transmission configured to transfer power from the motor to the driven component, the planetary transmission having a stationary carrier coupled with the motor housing, the carrier adapted to retain the at least one bearing.

2. The final drive assembly of claim 1, wherein the carrier is coupled to the motor housing by a plurality of bolts.

3. The final drive assembly of claim 2, wherein the plurality of bolts force the carrier against the at least one bearing to provide a desired pre-load force for retention of the at least one bearing.

4. The final drive assembly of claim 3, wherein a shoulder of the carrier abuts an inner race of the at least one bearing.

5. The final drive assembly of claim 2, wherein the carrier includes a plurality of pins, each pin configured to:
   locate a planet gear in mesh with a sun gear and a ring gear;
   receive at least one of the plurality of bolts; and
   assist in the retention of the carrier to the motor housing.

6. The final drive assembly of claim 5, wherein the pin has a bore to receive the at least one bolt, and wherein the bolt couples the carrier to the motor housing by retaining the carrier between the pin and the motor housing.

7. The final drive assembly of claim 1, wherein the carrier is interchangeable, can be removed from the motor housing and can be replaced with a different carrier having a different gear ratio.

8. The final drive assembly of claim 1, wherein the driven component comprises a sprocket hub coupled to a sprocket of a track assembly.

9. The final drive assembly of claim 1, wherein the motor comprises a closed circuit hydrostatic motor.

10. The final drive assembly of claim 1, wherein the planetary transmission comprises a first planetary gear set adapted transfer power from the motor to a second planetary gear set, the second planetary gear set adapted to reduce the speed from the first planetary gear set and transfer the power to the driven component, and wherein said carrier is part of the second planetary gear set.

11. The final drive assembly of claim 1, wherein the machine is a track-type tractor.

12. A final drive assembly for driving a sprocket hub of a machine, comprising:
   a motor coupled with a motor housing, the sprocket hub rotatably mounted on the motor housing by at least one sprocket bearing; and
   a first planetary gear set operatively configured to transfer power from the motor to a second planetary gear set, the second planetary gear set including:
   a sun gear adapted to receive power from the first planetary gear set;
   a plurality of planet gears in meshing contact with the sun gear and a ring gear, the ring gear coupled to the sprocket hub; and
   a stationary carrier locating the plurality of planet gears, the stationary carrier coupled with the motor housing and adapted to retain the at least one sprocket bearing.

13. The final drive assembly of claim 12, wherein the stationary carrier is coupled to the motor housing by a plurality of removable bolts, the plurality of removable bolts forcing the carrier against the at least one sprocket bearing to provide a desired pre-load force for retention of the at least one sprocket bearing.

14. The final drive assembly of claim 13, further comprising a plurality of pins within the stationary carrier, each of the plurality of pins configured to locate one of the planet gears, each of the plurality of pins having a bore to receive one of the removable bolts, and wherein at least some of the removable bolts are received in the bores of the pins to retain the stationary carrier to the motor housing.

15. The final drive assembly of claim 12, wherein the stationary carrier can be interchanged with a different carrier to provide different drive requirements.

16. The final drive assembly of claim 12, wherein a shoulder of the stationary carrier abuts an inner race of the at least one sprocket bearing.

17. A method for constructing a final drive assembly, comprising:
   providing the final drive assembly with a motor, a motor housing coupled with the motor, a sprocket hub rotatably mounted on the motor housing by at least one sprocket bearing, and a planetary transmission having a stationary carrier;
   abutting the stationary carrier against the at least one sprocket bearing and the motor housing; and bolting the stationary carrier to the motor housing to retain the at least one sprocket bearing.

18. The method of claim 17, wherein the planetary transmission comprises a first reduction gear set operatively configured to transfer power from the motor to a second reduction gear set, the second reduction gear set comprising:
- a sun gear adapted to receive power from the first planetary gear set;
- a plurality of planet gears in meshing contact with the sun gear and a ring gear, the ring gear coupled to the sprocket hub; and
- the stationary carrier, wherein the stationary carrier locates the plurality of planet gears.

19. The method of claim 17, wherein a shoulder of the stationary carrier abuts the inner race of the at least one sprocket bearing.

20. The method of claim 17, wherein the stationary carrier can be interchanged with a different carrier to provide different drive requirements.

\* \* \* \* \*